(12) United States Patent
Chen et al.

(10) Patent No.: US 9,176,533 B2
(45) Date of Patent: Nov. 3, 2015

(54) DISPLAY DEVICE AND ASSEMBLING METHOD THEREOF

(75) Inventors: Pai-Feng Chen, Taipei (TW); Po-An Lin, Taipei (TW); Kuo-Nan Ling, Taipei (TW); Yung-Hui Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 240 days.

(21) Appl. No.: 13/615,553

(22) Filed: Sep. 13, 2012

(65) Prior Publication Data

US 2013/0077227 A1   Mar. 28, 2013

Related U.S. Application Data

(60) Provisional application No. 61/539,473, filed on Sep. 26, 2011.

(51) Int. Cl.
*G06F 1/16* (2006.01)
*G02F 1/1333* (2006.01)

(52) U.S. Cl.
CPC ............ *G06F 1/1637* (2013.01); *G06F 1/1601* (2013.01); *G06F 1/1681* (2013.01); *Y10T 29/49002* (2015.01)

(58) Field of Classification Search
CPC ............................. G06F 1/1601; G06F 1/1637
USPC ............. 361/679.01–679.45, 679.55–679.59, 361/679.24; 349/58–60
See application file for complete search history.

(56) References Cited

U.S. PATENT DOCUMENTS

| | | | |
|---|---|---|---|
| 6,411,501 B1 * | 6/2002 | Cho et al. | 361/679.27 |
| 6,522,529 B1 * | 2/2003 | Huilgol et al. | 361/679.06 |
| 6,525,790 B1 * | 2/2003 | Kan-o | 349/58 |
| 7,433,179 B2 * | 10/2008 | Hisano et al. | 361/679.27 |
| 8,009,415 B2 * | 8/2011 | Xia et al. | 361/679.27 |
| 2003/0223020 A1 * | 12/2003 | Lee | 349/58 |
| 2004/0041961 A1 * | 3/2004 | Lee | 349/58 |
| 2004/0120104 A1 * | 6/2004 | Jeong et al. | 361/681 |
| 2006/0023404 A1 * | 2/2006 | Ling | 361/681 |
| 2007/0030636 A1 * | 2/2007 | Kim | 361/683 |
| 2007/0134955 A1 * | 6/2007 | Chiang et al. | 439/131 |
| 2009/0231794 A1 * | 9/2009 | Bhutani | 361/679.21 |
| 2010/0265427 A1 * | 10/2010 | Chiu et al. | 349/58 |
| 2011/0075378 A1 | 3/2011 | Tanaka et al. | |

FOREIGN PATENT DOCUMENTS

TW          201111865          4/2011

OTHER PUBLICATIONS

"Office Action of Germany counterpart application" with English translation thereof, issued on May 16, 2013, p. 1-p. 9.
"Office Action of Taiwan Counterpart Application," issued on Feb. 25, 2015, p. 1-p. 6.

* cited by examiner

*Primary Examiner* — Nidhi Thaker
(74) *Attorney, Agent, or Firm* — Jianq Chyun IP Office

(57) ABSTRACT

A display device is provided, which includes a back cover and a display module. The back cover has a positioning slot. The display module includes a first frame, a panel module and at least hinge bracket. The first frame is fixed to the back cover. The panel module is fixed to the first frame. The hinge bracket is screwless-mounted to the first frame. One end of the hinge bracket is inserted into the positioning slot to fix the display module to the back cover. Besides, a method for assembling a display device is also provided.

16 Claims, 17 Drawing Sheets

DISPLAY DEVICE AND ASSEMBLING METHOD THEREOF

CROSS-REFERENCE TO RELATED APPLICATION

This application claims the priority benefits of U.S. provisional application Ser. No. 61/539,473, filed on Sep. 26, 2011. The entirety of the above-mentioned patent applications is hereby incorporated by reference herein and made a part of this specification.

BACKGROUND OF THE INVENTION

1. Field of the Invention

The present invention relates to a display device and a method for assembling the display device, and more particularly, to a display device with a hinge bracket and a method for assembling the display device with the hinge bracket.

2. Description of Related Art

Owing to the advancement of semiconductor devices and display technology, electronic products have been continuously developed toward the trend of small size, multi-function and easy carry. Common portable electronic products include notebook computers, tablet computers and mobile phones. Taking a notebook computer as an example, it consists of a host and a display device that are pivotably mounted to each other. Users may close the display device and the host of the notebook computer for easy carry, and, when desired, may open the display device with respect to the host for operating the notebook computer or watching the displayed image.

The display device of the notebook computer includes a frame and a hinge bracket. The frame is used to fix the display panel and the backlight module. The hinge bracket is used to assemble a hinge assembly, such that the display device can be pivotably mounted to the host with the hinge assembly. In general, the frame and the hinge bracket are mostly assembled in a screw-mounting manner. In order to provide the room for screw-mounting, the display device must have sufficient thickness and width, which limits the low-profile design of the display device.

SUMMARY OF THE INVENTION

Accordingly, the present invention is directed to a display device in which a hinge bracket is screwless-mounted to a first frame.

The present invention is also directed to a method for assembling a display device in which a hinge bracket is screwless-mounted to a first frame.

The present invention provides a display device including a back cover and a display module. The back cover has a positioning slot. The display module includes a first frame, a panel module and at least hinge bracket. The first frame is fixed to the back cover. The panel module is fixed to the first frame. The hinge bracket is screwless-mounted to the first frame. One end of the hinge bracket is inserted into the positioning slot to fix the display module to the back cover.

In one embodiment, the hinge bracket is adhered to the first frame.

In one embodiment, the hinge bracket is soldered to the first frame.

In one embodiment, the first frame has at least one positioning hole. The hinge bracket includes at least one positioning post, and the positioning post is inserted into the positioning hole.

In one embodiment, the end of the hinge bracket protrudes beyond one side of the first frame and is inserted into the positioning slot.

In one embodiment, the display module further includes a hinge assembly. The other end of the hinge bracket protrudes beyond another side of the first frame and is fixed to the hinge assembly.

In one embodiment, the hinge assembly is fixed to the back cover and the panel module is a panel module with touch function.

In one embodiment, the panel module includes a display panel and a backlight module. The display panel is disposed on a second frame. The first frame and the second frame are fixed to each other.

In one embodiment, the display device further includes a front frame fixed to the back cover. The display module is located between the front frame and the back cover.

In one embodiment, the first frame includes a sidewall. The hinge bracket is fixed to an outside of the sidewall, and the sidewall is located between the hinge bracket and the panel module.

In one embodiment, the first frame further includes an extension wall, and the extension wall is connected to the sidewall and surrounds at least part of the hinge bracket.

In one embodiment, the first frame further includes a bent wall, and the bent wall is connected to the sidewall and is located between the hinge bracket and the sidewall.

In one embodiment, the first frame includes a sidewall, and the hinge bracket is fixed to an inner side of the sidewall and is located between the sidewall and the panel module.

The present invention provides a method for assembling a display device. A first frame and at least one hinge bracket are first provided. The hinge bracket is then screwless-mounted to the first frame. A panel module is provided. The panel module is fixed to the first frame after fixing the hinge bracket to the first frame. A back cover is provided, which has a positioning slot. After fixing the panel module to the first frame, the first frame is fixed to the back cover and one end of the hinge bracket is inserted into the positioning slot.

In one embodiment, the step of fixing the hinge bracket to the first frame includes adhering the hinge bracket to the first frame.

In one embodiment, the step of fixing the hinge bracket to the first frame includes soldering the hinge bracket to the first frame.

In one embodiment, the first frame has at least one positioning hole, the hinge bracket includes at least one positioning post. The step of fixing the hinge bracket to the first frame includes inserting the positioning post into the positioning hole.

In one embodiment, the method for assembling the display device further includes providing a hinge assembly; and fixing the hinge assembly to the hinge bracket.

In one embodiment, the method for assembling the display device further includes fixing the hinge assembly to the back cover.

In one embodiment, the method for assembling the display device further includes providing a front frame; and fixing the front frame to the back cover such that the display module is located between the front frame and the back cover.

In view of the foregoing, in embodiments of the present invention, the hinge bracket is screwless-mounted to the first frame. Therefore, the room for screw-mounting is not required in the display device, such that the overall structure has a reduced thickness and width, which facilitates the low-profile and lightweight designs. In addition, under the condition where the first frame with small thickness is selected in order to reduce the overall structure thickness, the hinge bracket may be first mounted to the first frame during assembly of the display device, such that the first frame with small thickness has sufficient structural strength for subsequent assembly steps. Furthermore, inserting the end of the hinge bracket into the positioning slot of the back cover can not only make the overall structure more solid, but it can also reduce the space the hinge bracket occupies in the display device to further reduce the width of the display device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
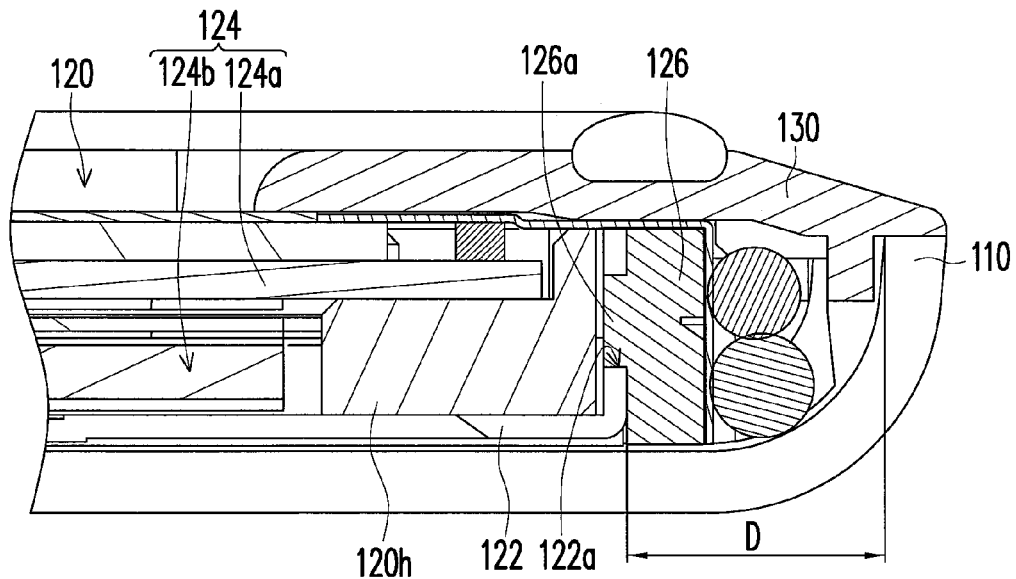
FIG. 1 is a partial, cross-sectional view of a display device according to one embodiment of the present invention.
Figure 2:
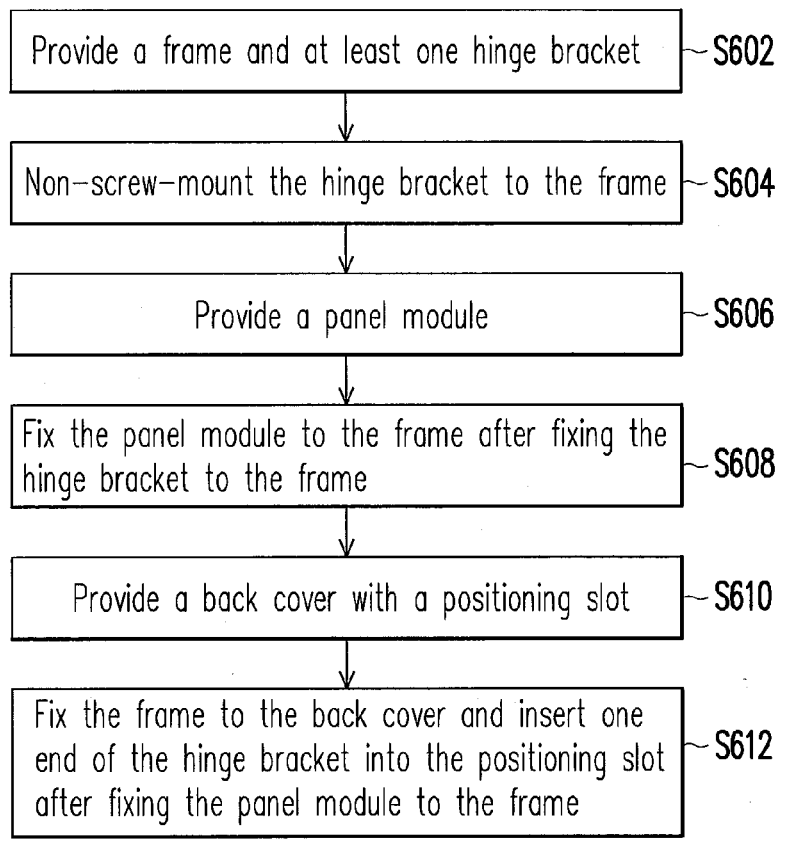
FIG. 2 is a flow chart of assembly of the display device of FIG. 1.
Figure 3A:
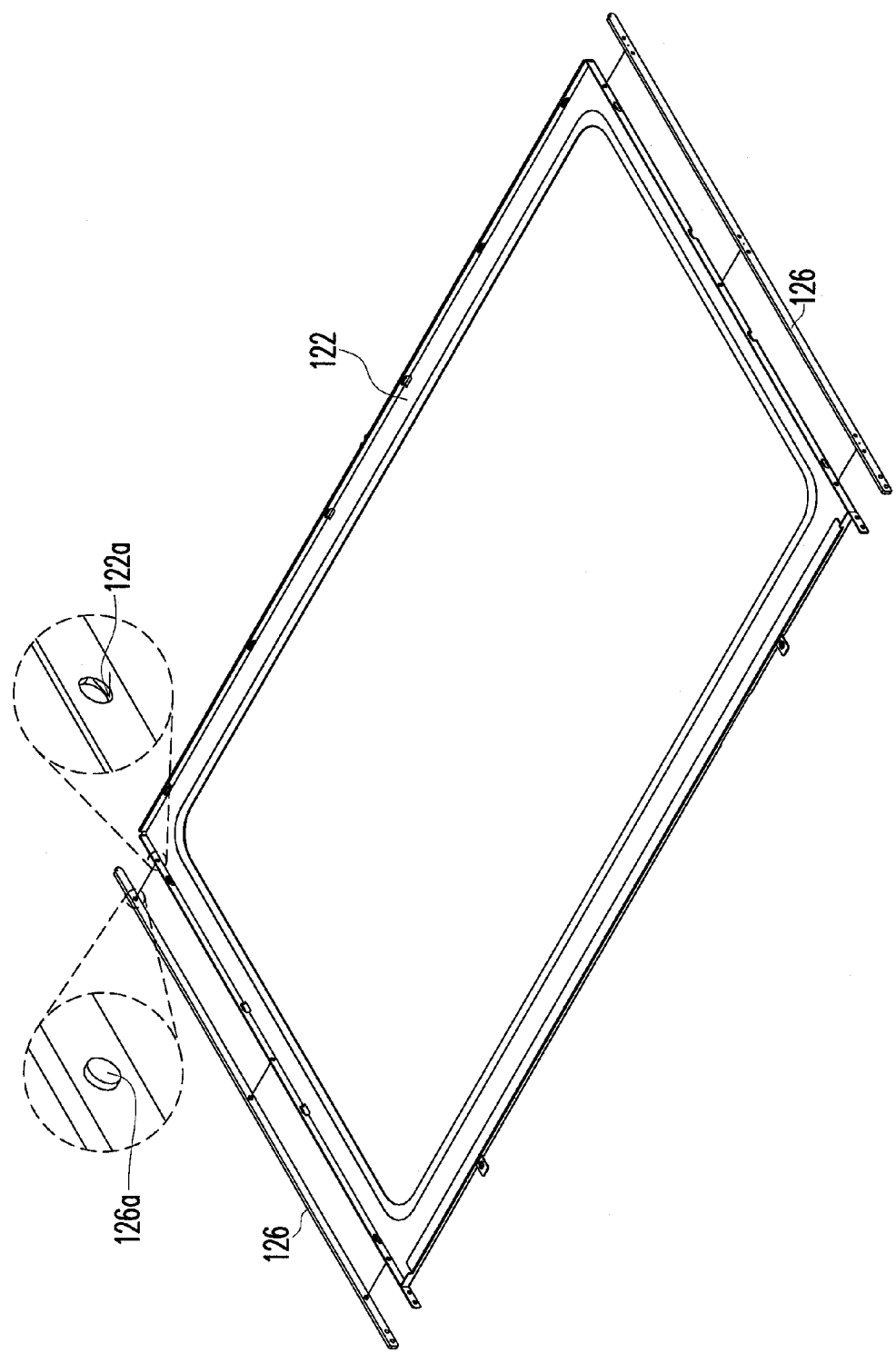
FIG. 3A to FIG. 3N illustrate assembly steps of the display device of FIG. 1.
Figure 3B:
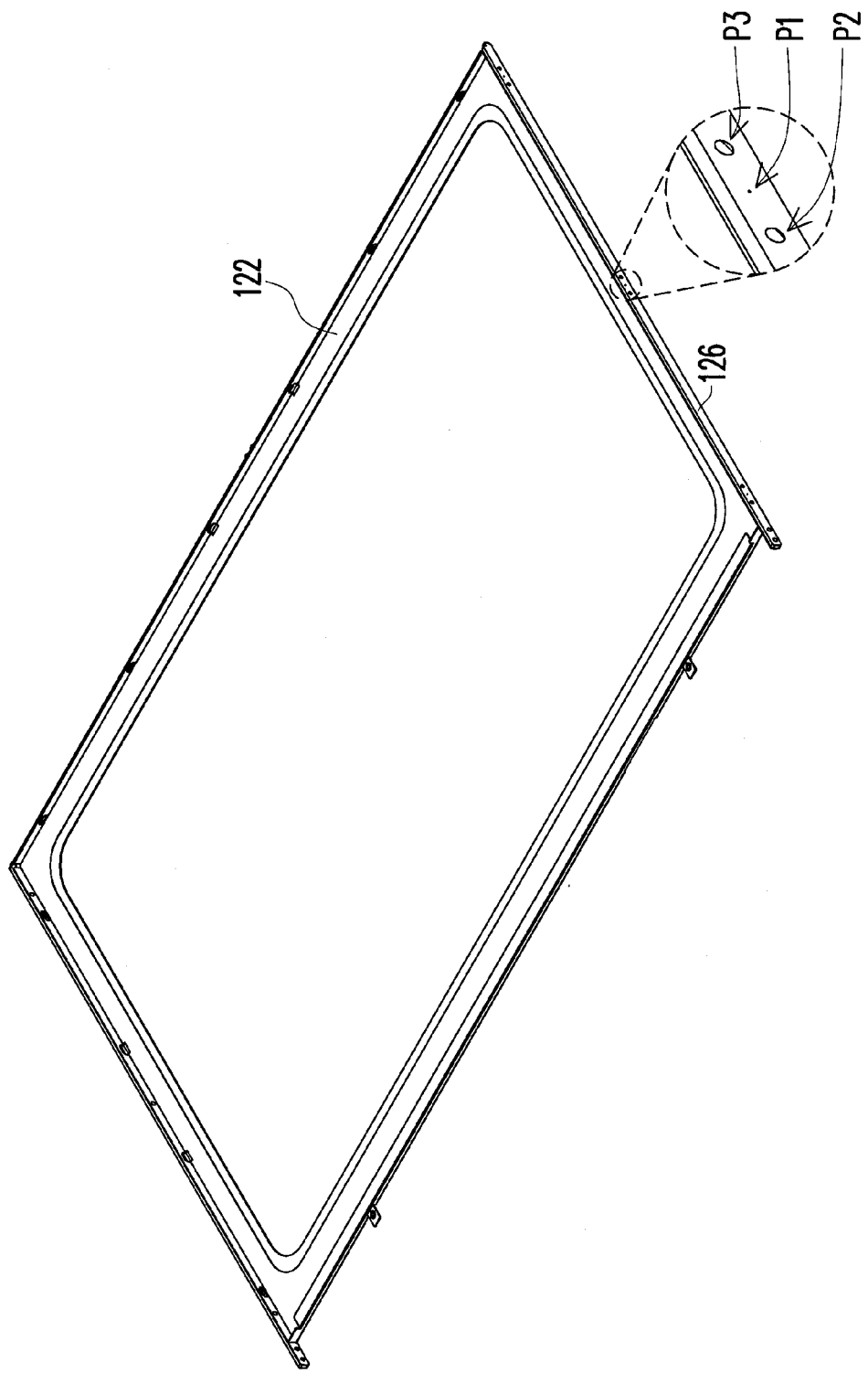

FIG. 1 is a partial, cross-sectional view of a display device according to one embodiment of the present invention. FIG. 2 is a flow chart of assembly of the display device of FIG. 1. FIG. 3A to FIG. 3N illustrate assembly steps of the display device of FIG. 1. Referring to FIG. 2 and FIG. 3A, a first frame 122 and at least one hinge bracket 126 are provided (step S602). Referring to FIG. 2 and FIG. 3B, the hinge bracket 126 is screwless-mounted to the first frame 122 (step S604). For example, the hinge bracket 126 may be fixed to the first frame 122 with adhesive or by soldering. However, it is not intended to limit the mounting to any particular manner. In another embodiment, the hinge bracket 126 may be fixed to the first frame 122 in another suitable screwless-mounting manner.

Referring to FIG. 1 and FIG. 3A, in the present embodiment, the first frame 122 includes at least one positioning hole 122a, the hinge bracket 126 includes at least one positioning post 126a, and the positioning post 126a is inserted into the positioning hole 122a to fix the position of the hinge bracket 126 relative to the first frame 122. In addition, referring to FIG. 3B, point-soldering is conducted at, for example, position P2 and position P3 on opposite sides of position P1 where the positioning post 126a (labeled in FIG. 3A) is located, to fix the hinge bracket 126 to the first frame 122. In the present embodiment, the material of the first frame 122 is, for example, metal such as, aluminium alloy, magnesium alloy, or magnesium-aluminium alloy. The material of the first frame 122 may also be plastic. It is not intended to limit the first frame material to any particular material.

Under the condition where the first frame 122 with small thickness is selected in order to reduce the overall structure thickness, the hinge bracket 126 may be first mounted to the first frame 122 during assembly of the display device as described above, such that the first frame 122 with small thickness has sufficient structural strength for subsequent assembly steps as described below.

Figure 3C:
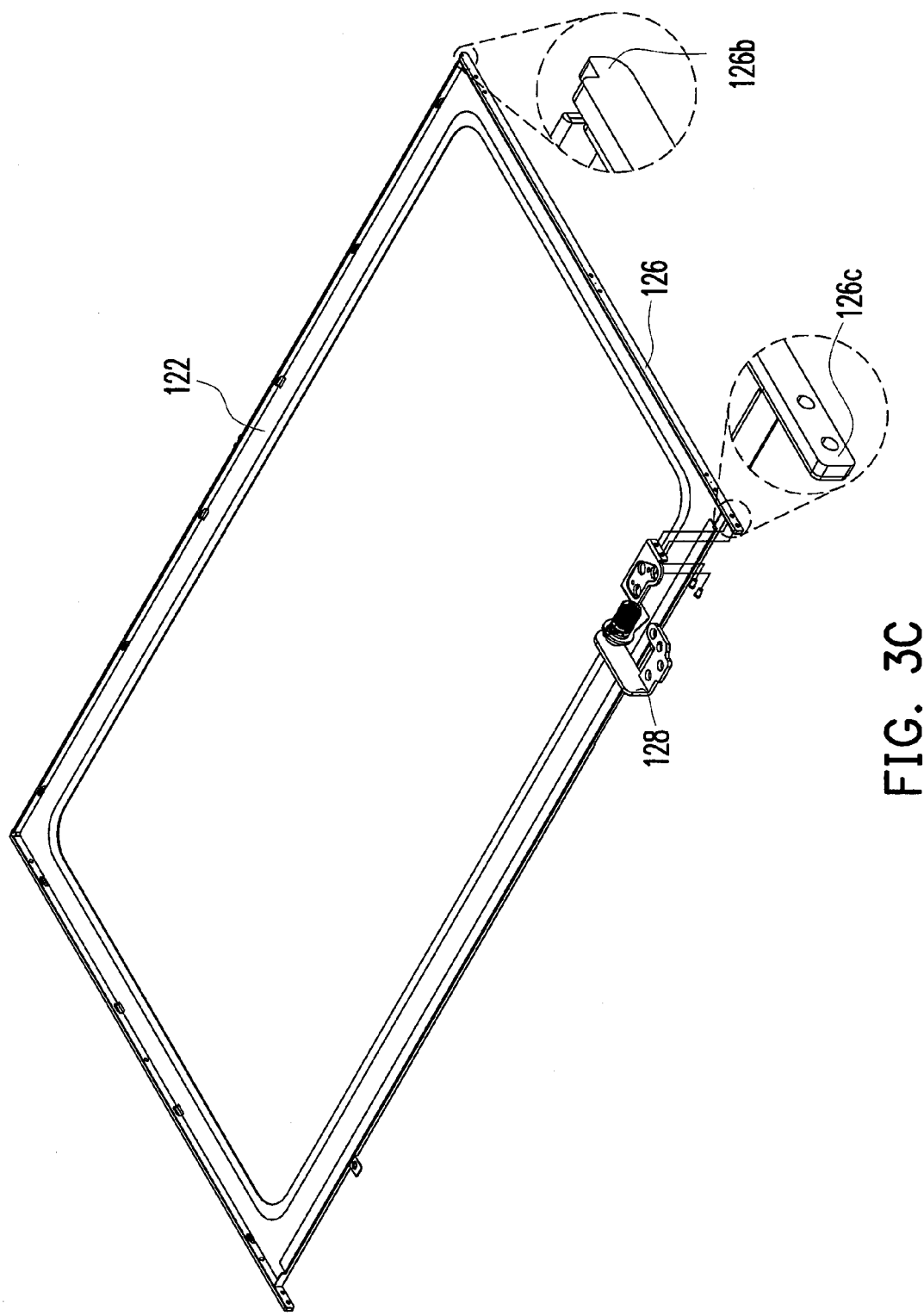
Figure 3D:
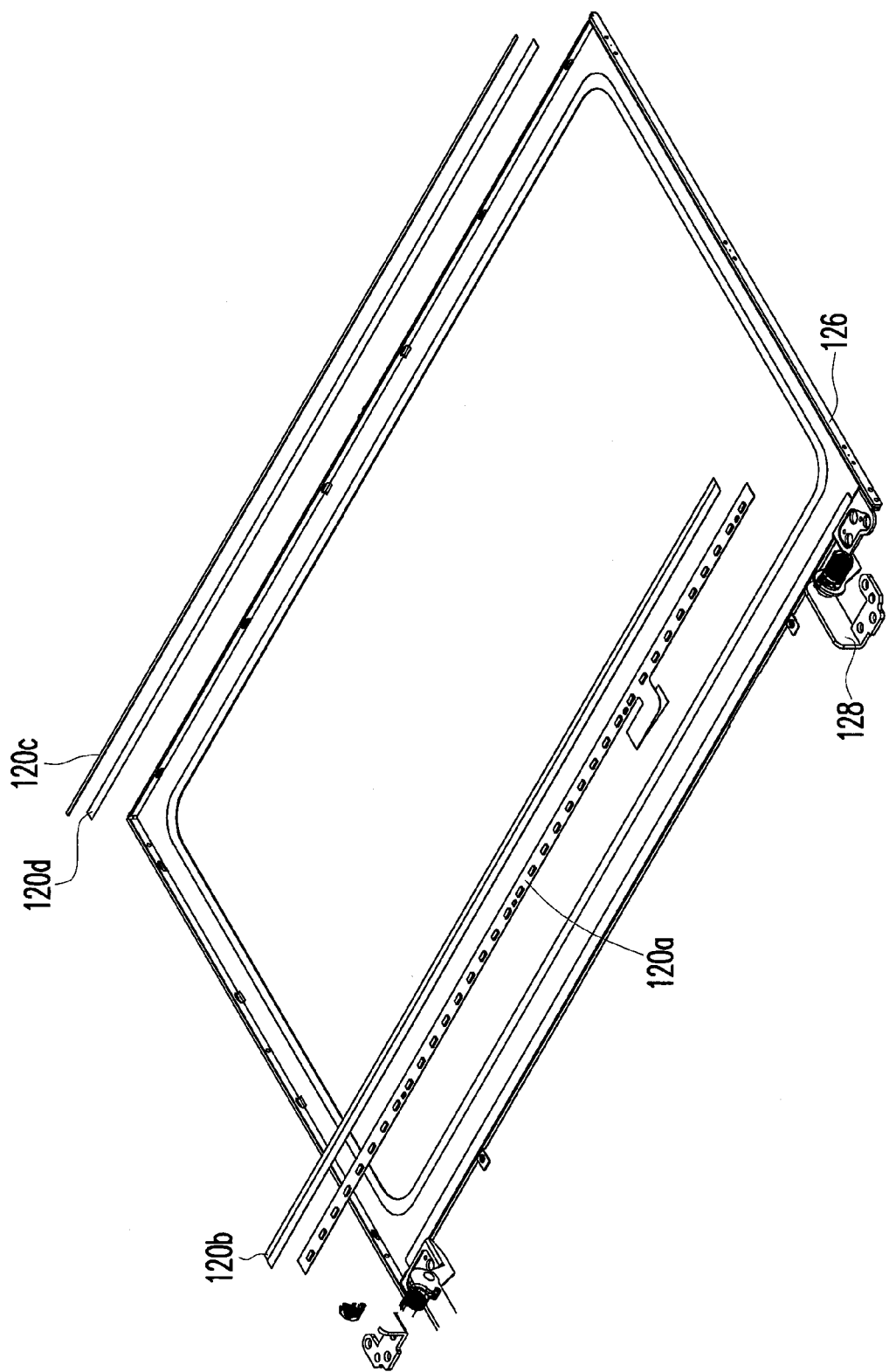
Figure 3E:
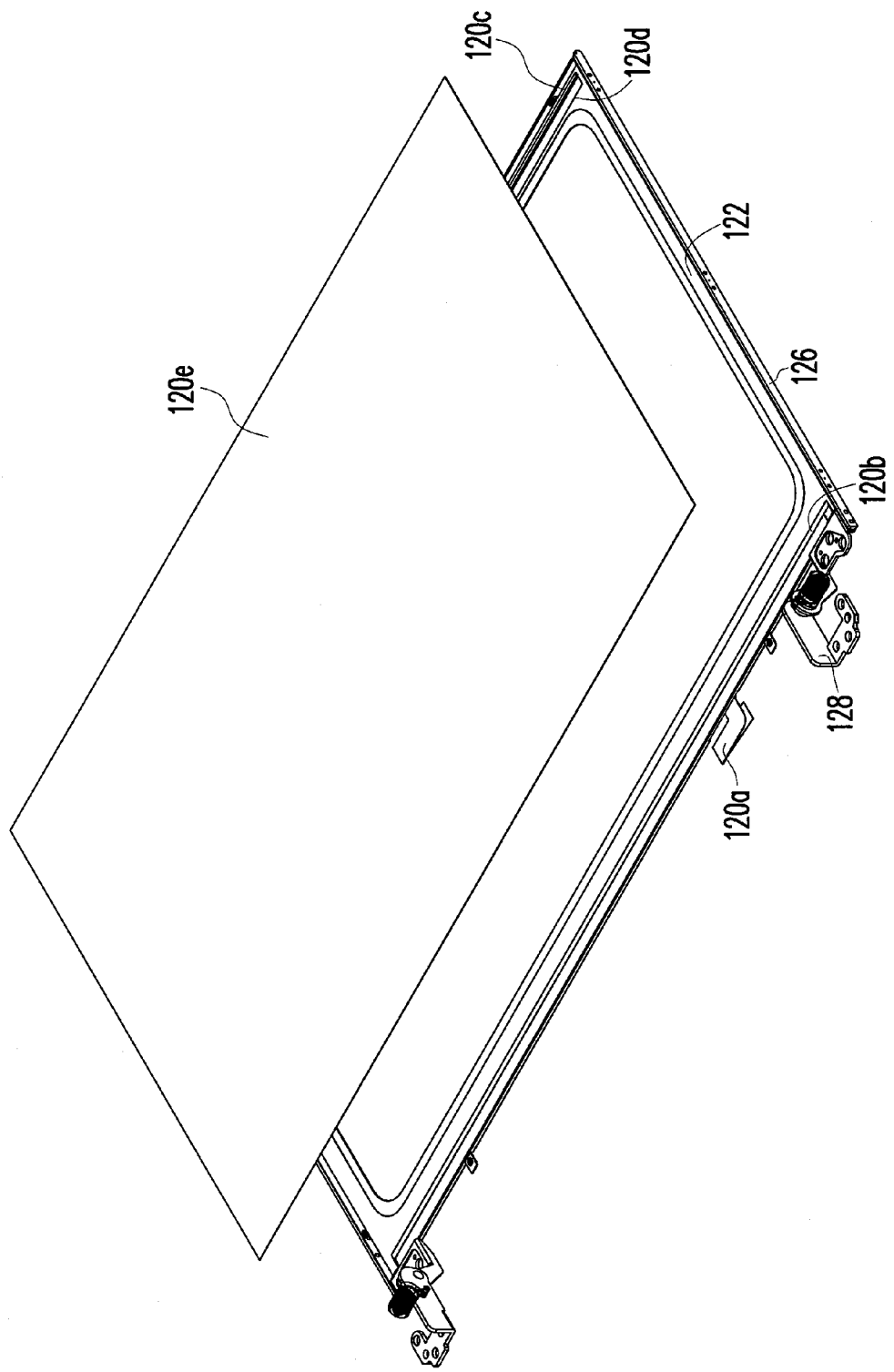
Figure 3F:
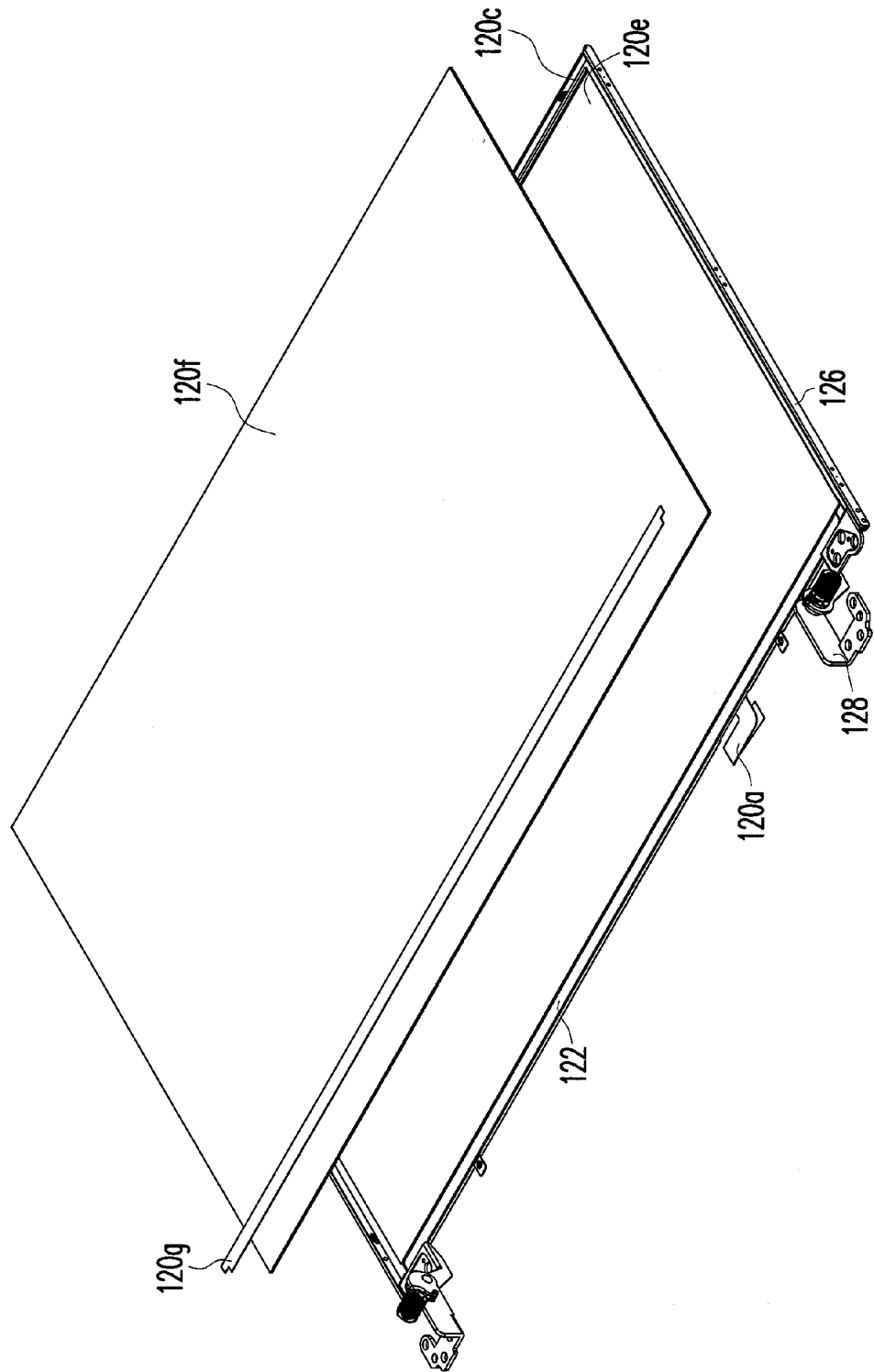
Figure 3G:
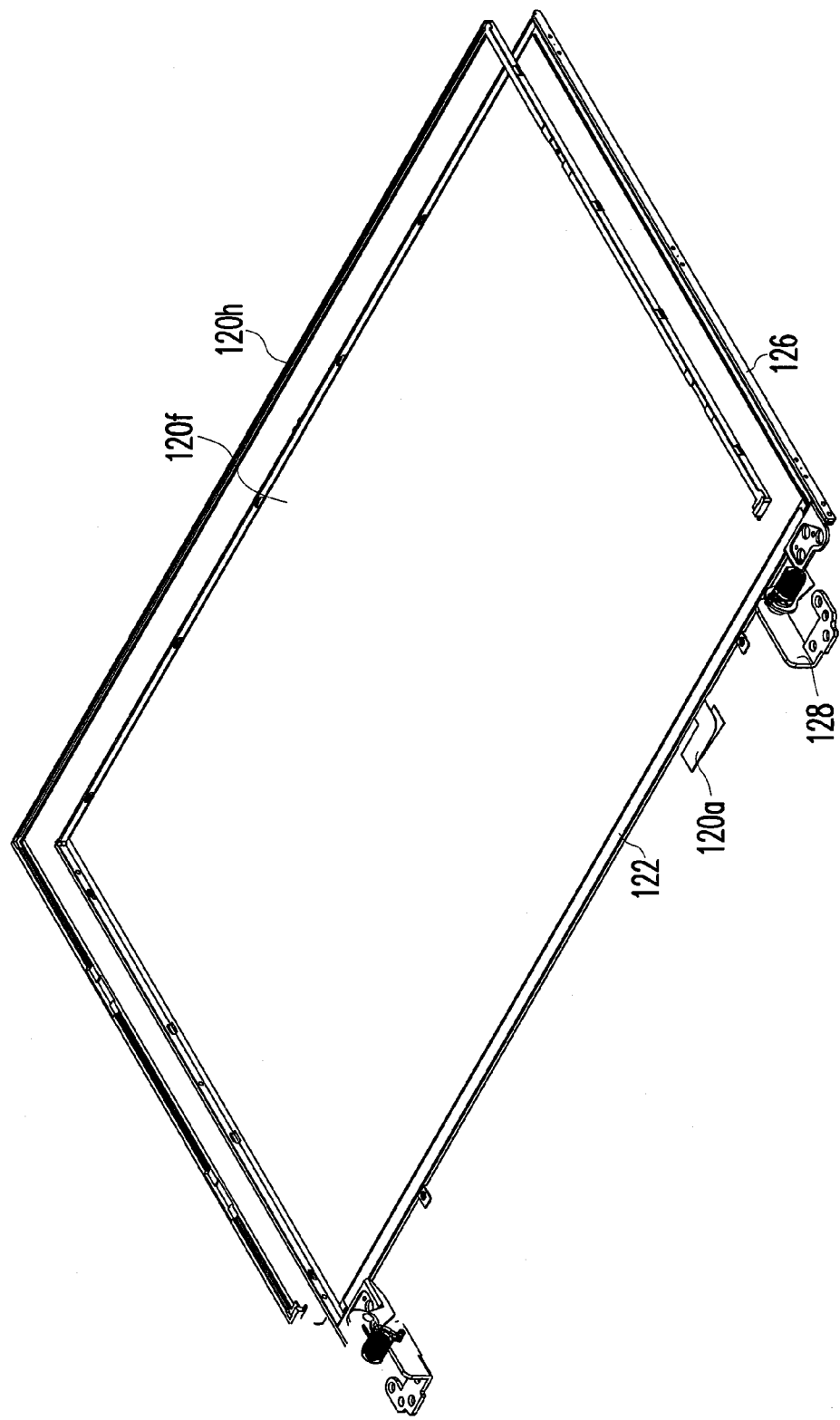
Figure 3H:
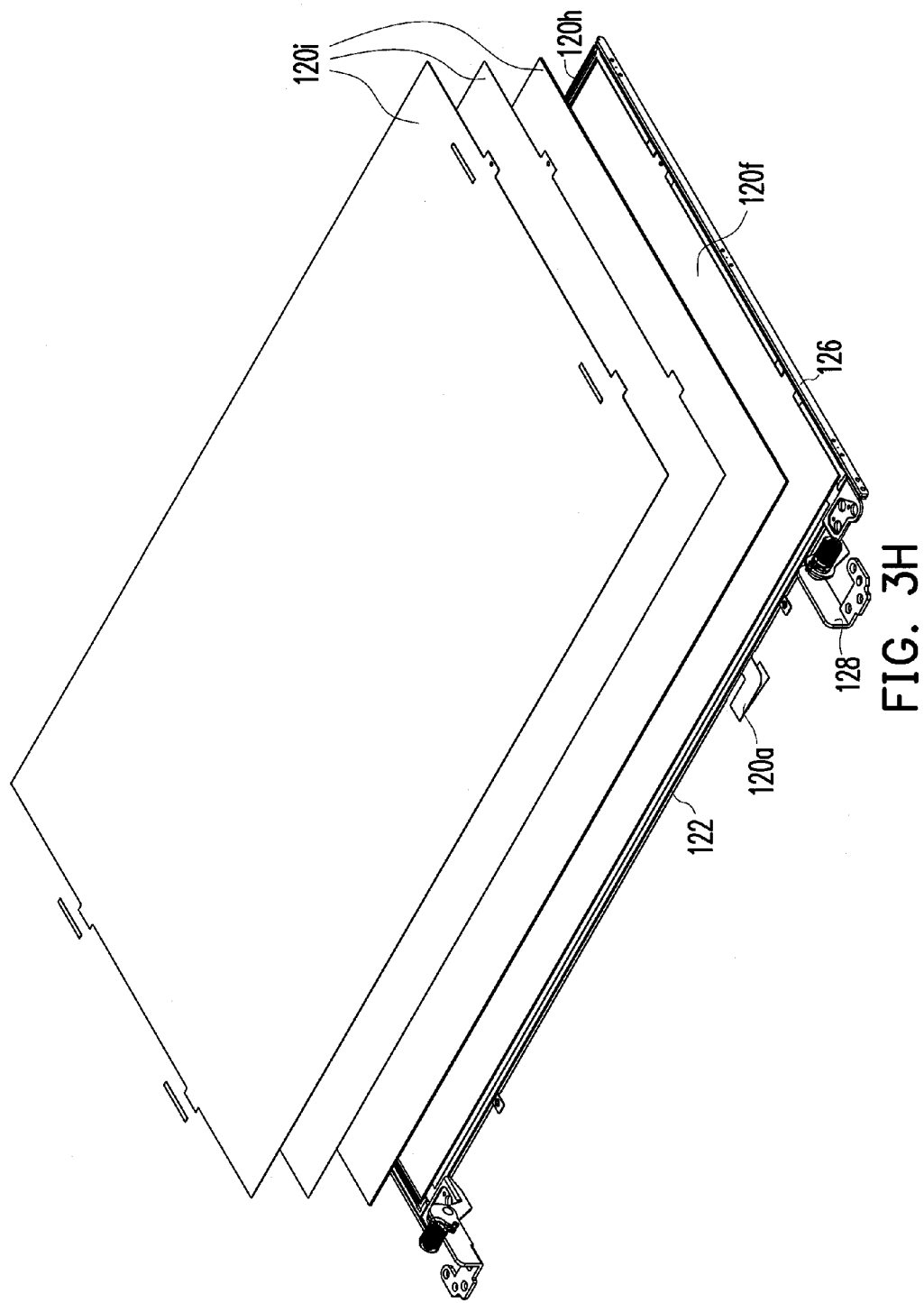
Figure 3I:
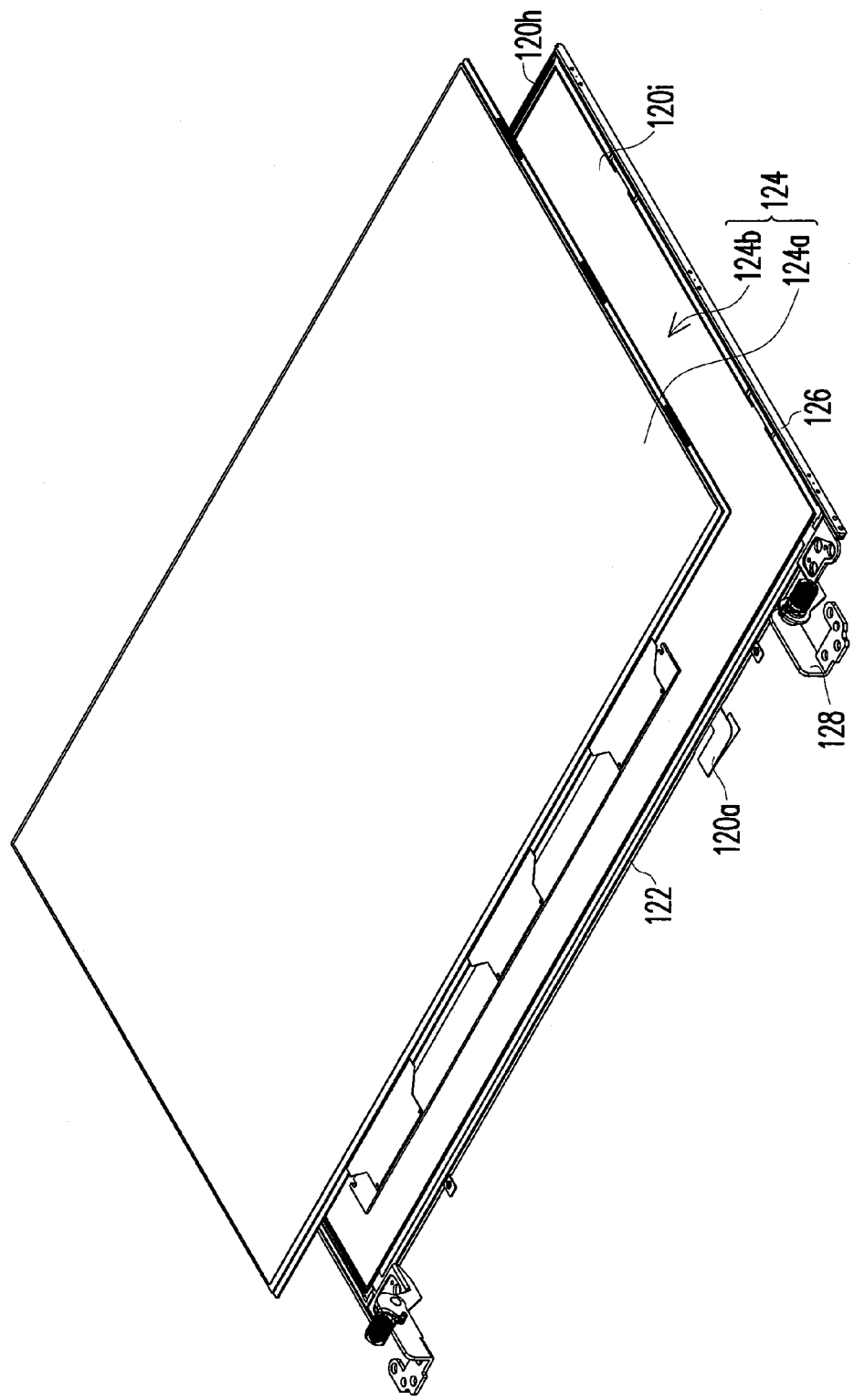
Figure 3J:
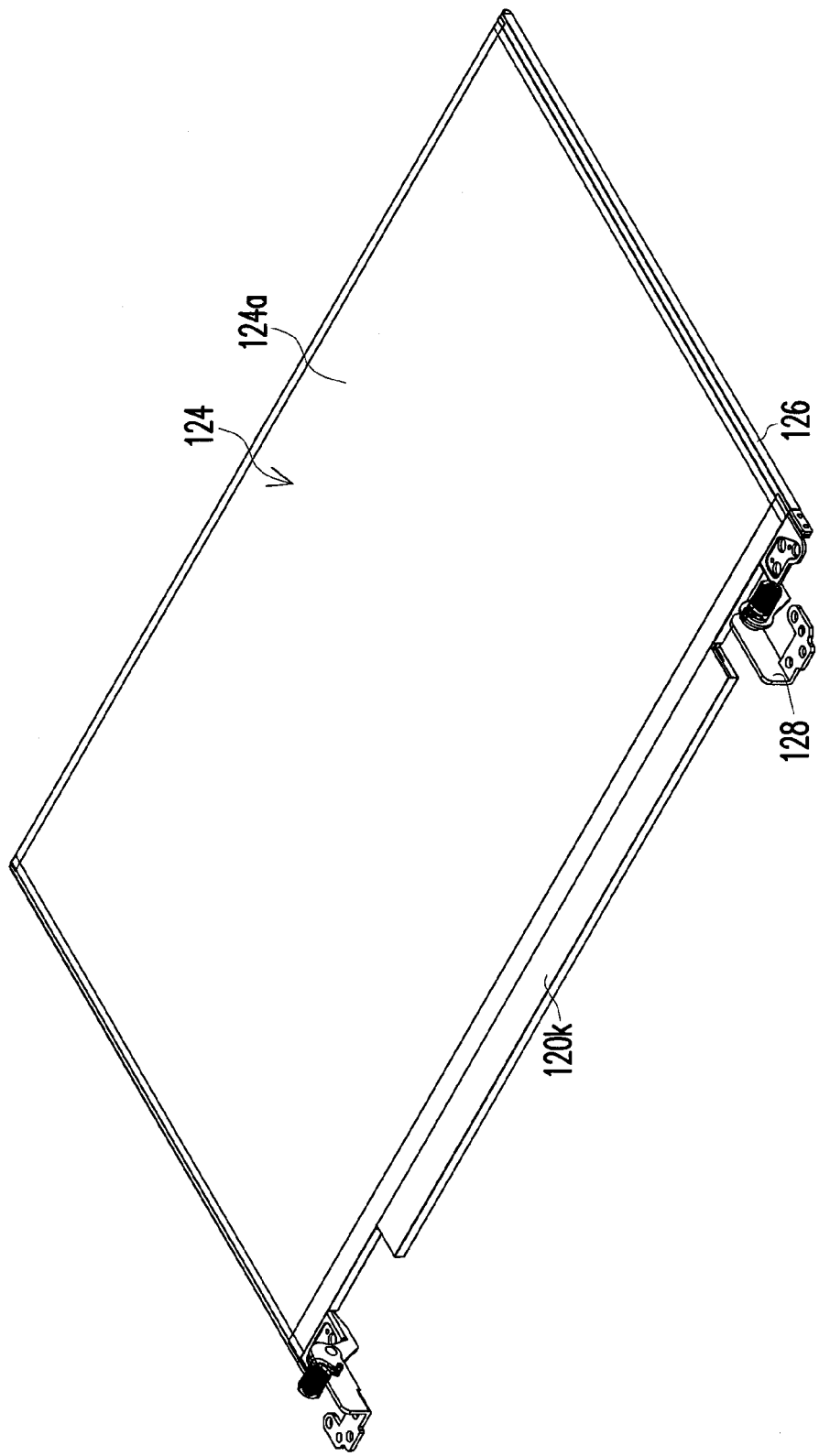

Referring to FIG. 3C, at least one hinge assembly 128 is provided after step S604. Referring to FIG. 3D, the hinge assembly 128 is fixed to the hinge bracket 126, and a light source assembly 120a, a first adhesive tape 120b, a second adhesive tape 120c and a third adhesive tape 120d are provided. The light source assembly 120a is, for example, a light emitting diode (LED) lamp strip. Referring to FIG. 3E, the light source assembly 120a is disposed at a lower side of the first frame 122 using the first adhesive tape 120b, the second adhesive tape 120c and third adhesive tape 120d are disposed at an upper side of the first frame 122, and a reflective sheet 120e is provided. Referring to FIG. 3F, the reflective sheet 120e is disposed on the first frame 122 using the third adhesive tape 120d (labeled in FIG. 3E), and a light guide plate 120f and a reflective adhesive tape 120g are provided. Referring to FIG. 3G, the light guide plate 120f is disposed on the first frame 122 using the second adhesive tape 120c (labeled in FIG. 3F), the reflective adhesive tape 120g (labeled in FIG. 3F) is affixed to the light guide plate 120f, and a second frame 120h is provided. Referring to FIG. 3H, the second frame 120h is mounted to the first frame 122, and an optical film assembly 120i is provided. The second frame 120h is, for example, snap mounted to the first frame 122, and the optical film assembly 120i includes, for example, a diffusion film and two prism films. The material of the first frame 122 and second frame 120h may be metal or plastic depending on the product design and is not intended to be limited to any particular material as described above. Referring to FIG. 3I, the optical film assembly 120i is disposed on the light guide plate 120f (labeled in FIG. 3H), and a display panel 124a is provided. Referring to FIG. 3J, the display panel 124a is disposed on the second frame 120h (labeled in FIG. 3I), and the display panel 124a and the second frame 120h are partially enclosed by a light-proof tape 120k.

The above light source assembly 120a, adhesive tape 120b, adhesive tape 120c, adhesive tape 120d, reflective sheet 120e, light guide plate 120f, reflective adhesive tape 120g, and optical film assembly 120i form a backlight module 124b (labeled in FIG. 3I), and the backlight module 124b and the display panel 124a form a panel module 124. In other words, during the assembly flow from FIG. 3D to FIG. 3J, a panel module 124 is provided (step S606), and the panel module 124 is fixed to the first frame 122 (step S608) after the hinge bracket 126 is fixed to the first frame 122. According to different product design, the panel module is a normal panel module or a panel module with touch function and the types of the panel module are not used to limit the present invention.

Figure 3K:
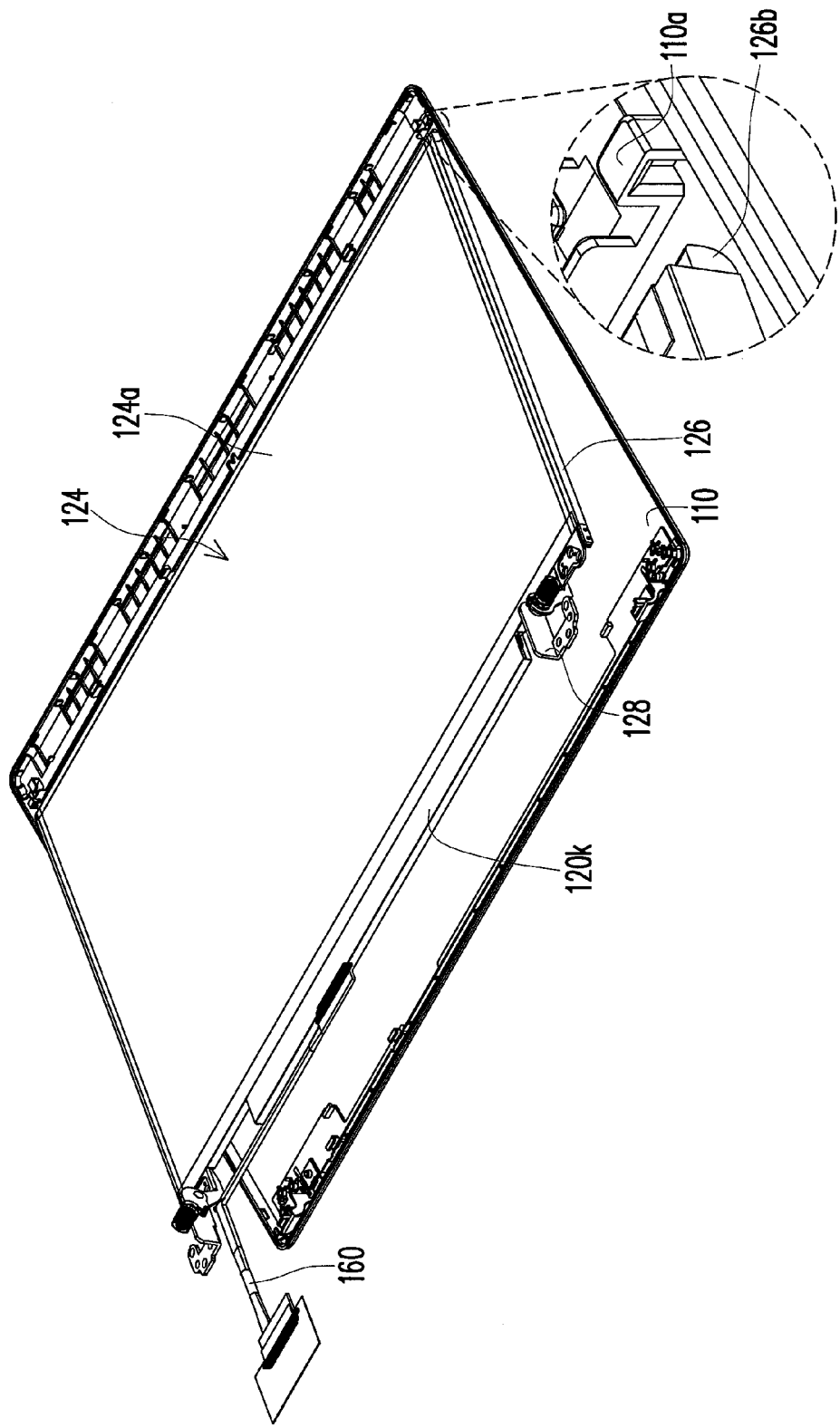
Figure 3L:
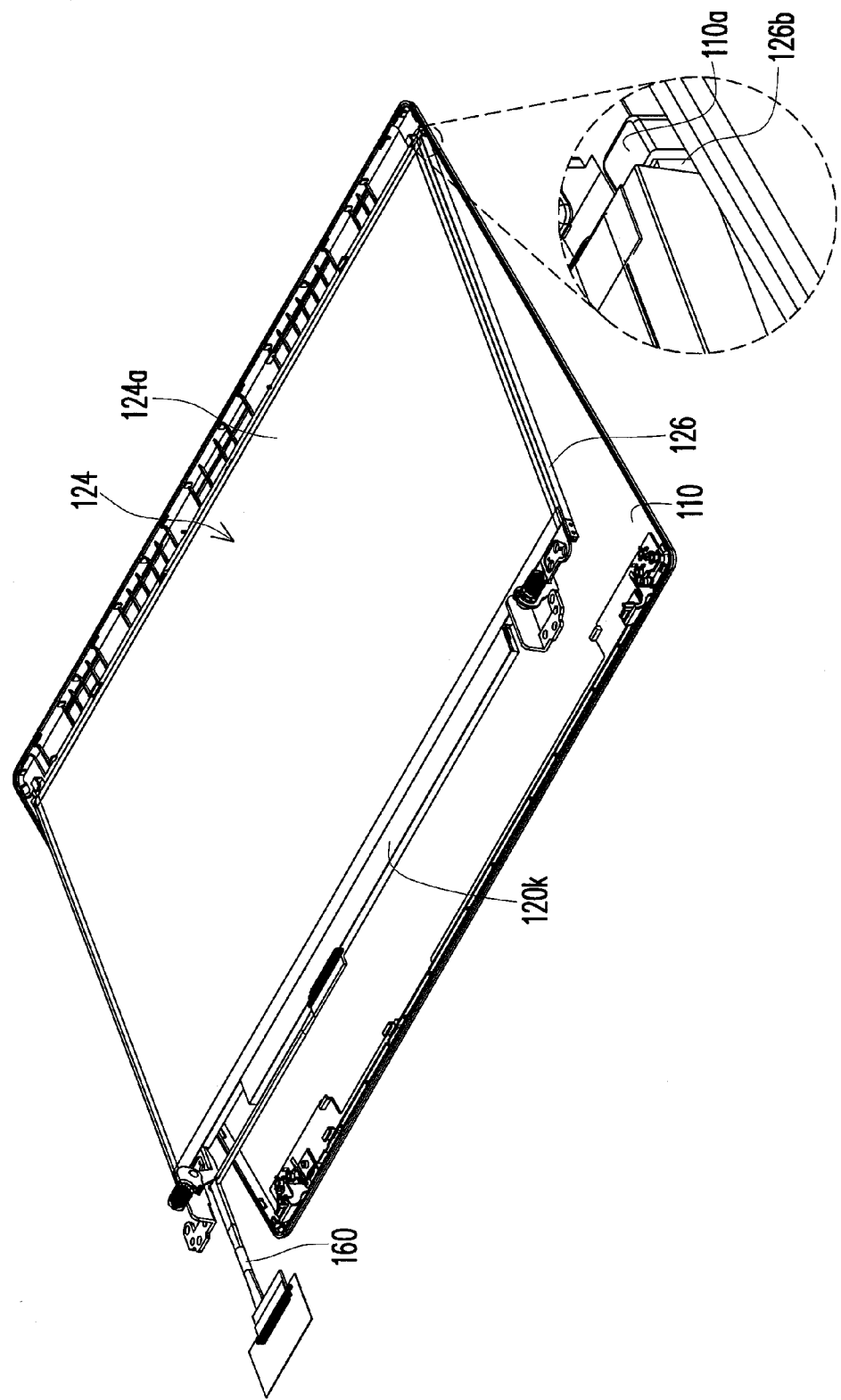
Figure 3M:
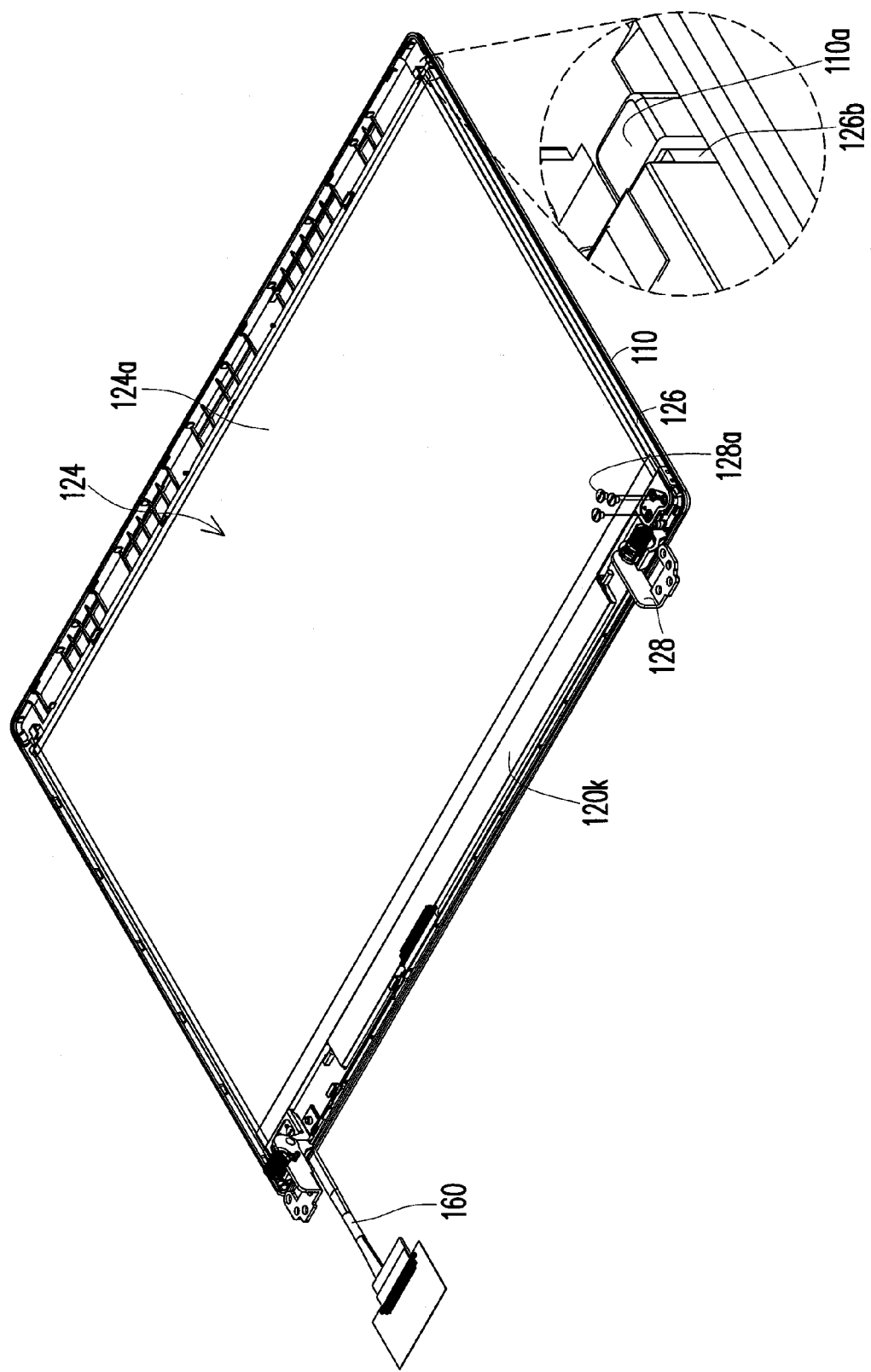
Figure 3N:
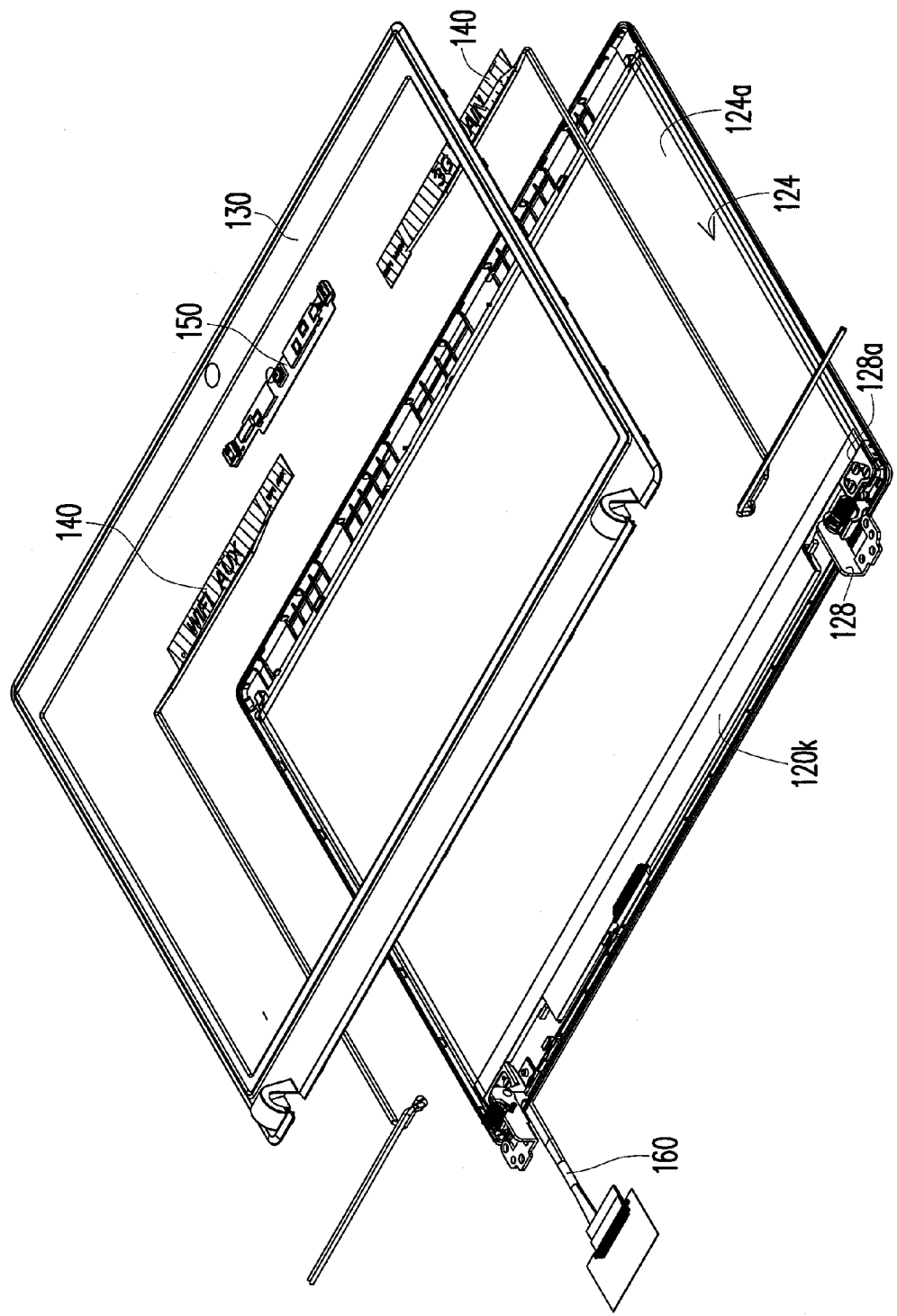

Referring to FIG. 2 and FIG. 3K, a back cover 110 is provided, which includes a positioning slot 110a (step S610). Referring to FIG. 2, FIG. 3L and FIG. 3M, as shown in FIG. 3L to FIG. 3M, the first frame 122 (labeled in FIG. 3I) is fixed to the back cover 110 and one end 126b of the hinge bracket 126 is inserted into the positioning slot 110a (step S612). In addition, the hinge assembly 128 is screw-mounted to the back cover 110 with a screw fastener 128a to make the overall structure more solid.

After the step S612, as shown in FIG. 3N, a front frame 130 may be provided and electronic components such as an antenna 140 and a camera module 150 are provided. The camera module 150 is, for example, a complementary metal-oxide semiconductor (CMOS) sensor or a charge coupled device (CCD) sensor.

Finally, the front frame 130 is fixed to the back cover 110, and the display module 120, antenna 140 and camera module 150 are all assembled between the front frame 130 and the back cover 110, thereby accomplishing the display device 100 of FIG. 1. The front frame 130 may also be snap-mounted with the first frame 122 and the second frame 126. It is not intended to limit the mounting of the front frame 130 to any particular manner.

As shown in FIG. 1, the display device 100 of the present embodiment includes the back cover 110 and the display module 120. The display module 120 includes the first frame 122, panel module 124 and hinge bracket 126. The first frame 122 is fixed to the back cover 110, and the panel module 124 is fixed to the first frame 122. The panel module 124 includes the display panel 124a and the backlight module 124b. The second frame 120h is fixed to the first frame 122 and is used to position the display panel 124a and the backlight module 124b. The front frame 130 is fixed to the back cover 110, and the display module 120 is located between the front frame 130 and the back cover 110. The hinge bracket 126 is screwless-mounted to the first frame 122. Therefore, the room for screw-mounting is not required in the display device 100, such that the overall structure has a reduced thickness and width, which facilitates the low-profile and lightweight designs. With the above design, a distance D between sides of the first frame 122 and the back cover 110 may be reduced to, for example, 2.5 mm to 6 mm. However, this should not be regarded as limiting. The distance D between the sides of the first frame 122 and the back cover 110 can be another suitable value.

As shown in FIG. 3C, the end 126b of the hinge bracket 126 protrudes beyond one side of the first frame 122 so as to be adapted to be inserted into the positioning slot 110a of the back cover 110, as shown in FIG. 3K to FIG. 3M. The other end 126c of the hinge bracket 126 protrudes beyond another side of the first frame 122 so as to be adapted to be fixed with the hinge assembly 128. As shown in FIG. 3K to FIG. 3M, inserting the end 126b of the hinge bracket 126 into the positioning slot 110a of the back cover 110 can not only fix the hinge bracket 126 to the back cover 110, but it can also reduce the space the hinge bracket 126 occupies in the display device to further reduce the width of the display device 100.

In the present embodiment, the display device 100 is, for example, a display device of a notebook computer, which can be pivotably mounted to a host of the notebook computer with the hinge assembly 128. The notebook computer may be provided with a connecting line 160 as shown in FIG. 3K to FIG. 3M. The connecting line 160 is connected between the panel module 124 and the host.

Figure 4:
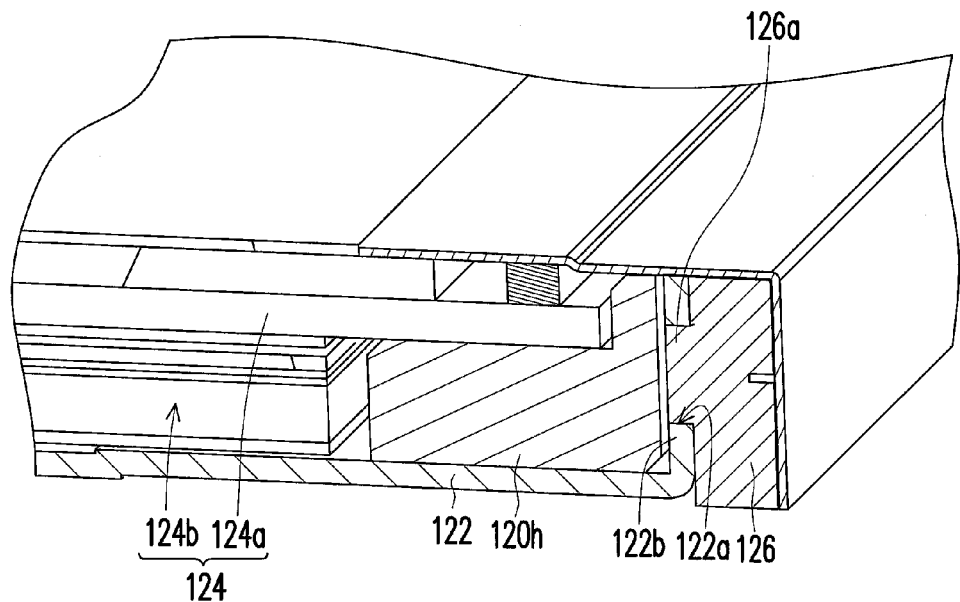
FIG. 4 is a perspective view of part of the components of the display device of FIG. 1.

FIG. 4 is a perspective view of part of the components of the display device of FIG. 1. Referring to FIG. 1, specifically, the first frame 122 of the present embodiment includes a sidewall 122b, the hinge bracket 126 is fixed to an outside of the sidewall 122b, and the sidewall 122b is located between the hinge bracket 126 and the panel module 124. The present invention is not intended to limit the mounting between the hinge bracket 126 and the sidewall 122b to any particular manner. The mounting between the hinge bracket 126 and the sidewall 122b is described below by way of examples.

Figure 5:
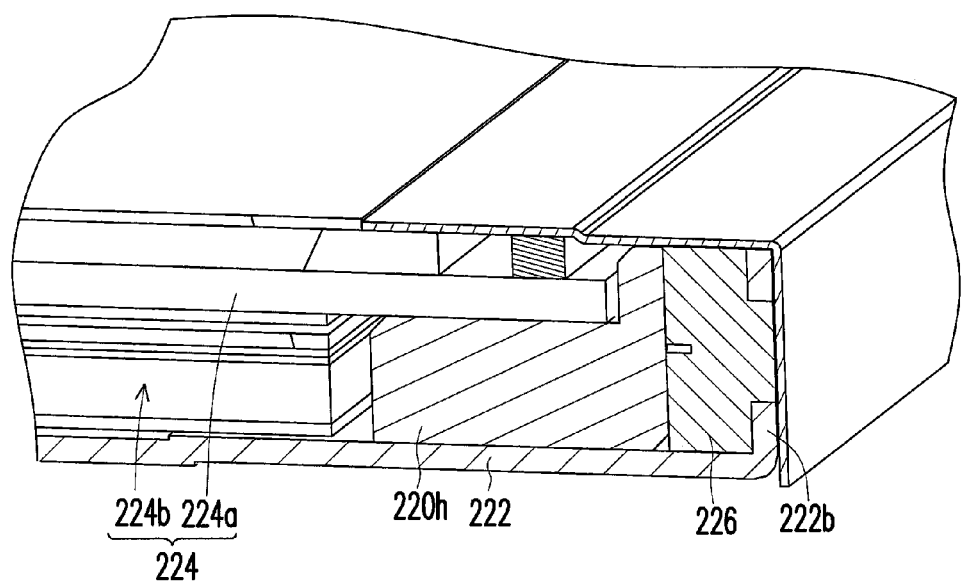
FIG. 5 is a perspective view of part of the components of the display device according to another embodiment of the present invention.

FIG. 5 is a perspective view of part of the components of the display device according to another embodiment of the present invention. Referring to FIG. 5, in the present embodiment, the display module 224, display panel 224a, backlight module 224b, second frame 220h and first frame 222 are constructed and assembled in a fashion similar to the display module 124, display panel 124a, backlight module 124b, second frame 120h and first frame 122 of FIG. 4 and therefore explanations thereof are not repeated herein. The embodiment of FIG. 5 differs from the embodiment of FIG. 4 in that the hinge bracket 226 is fixed to an inner side of the sidewall 222b of the first frame 222 and is located between the sidewall 222b and the panel module 224.

Figure 6:
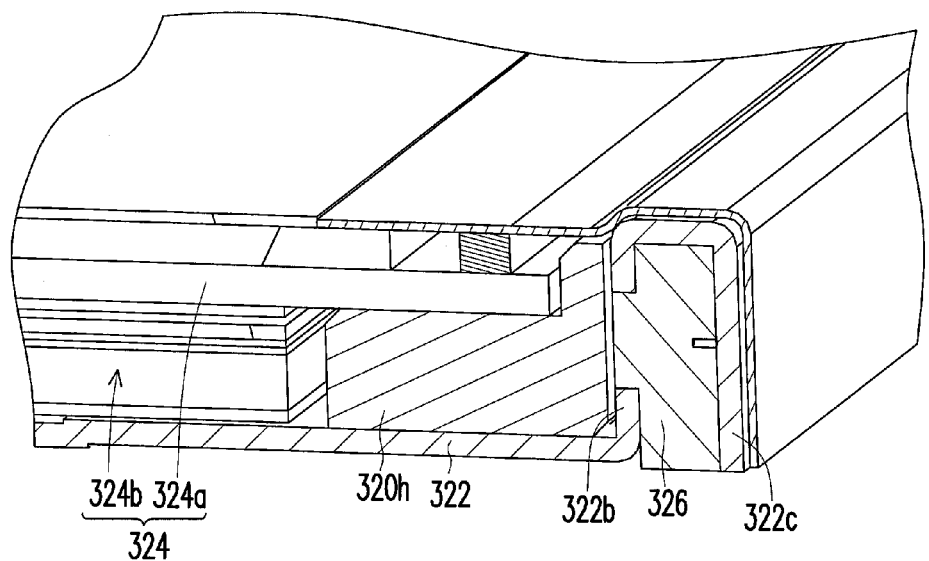
FIG. 6 is a perspective view of part of the components of the display device according to another embodiment of the present invention.

FIG. 6 is a perspective view of part of the components of the display device according to another embodiment of the present invention. Referring to FIG. 6, in the present embodiment, the display module 324, display panel 324a, backlight module 324b, second frame 320h and first frame 322 are constructed and assembled in a fashion similar to the display module 124, display panel 124a, backlight module 124b, second frame 120h and first frame 122 of FIG. 4 and therefore explanations thereof are not repeated herein. The embodiment of FIG. 6 differs from the embodiment of FIG. 4 in that the first frame 322 includes an extension wall 322c as well as the sidewall 322b. The extension wall 322c is connected to the sidewall 322b and surrounds at least part of the hinge bracket to enhance structural strength.

Figure 7:
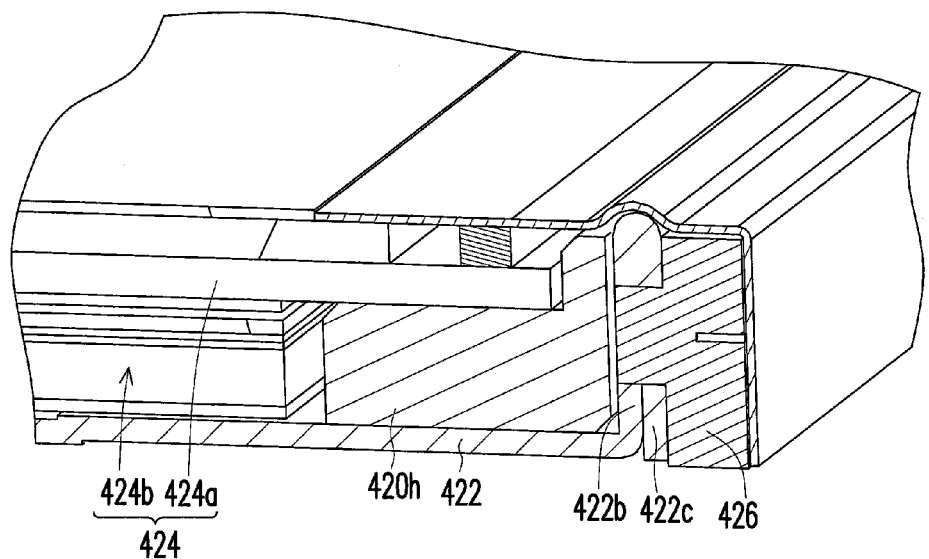
FIG. 7 is a perspective view of part of the components of the display device according to another embodiment of the present invention.

FIG. 7 is a perspective view of part of the components of the display device according to another embodiment of the present invention. Referring to FIG. 7, in the present embodiment, the display module 424, display panel 424a, backlight module 424b, second frame 420h and first frame 422 are constructed and assembled in a fashion similar to the display module 124, display panel 124a, backlight module 124b, second frame 120h and first frame 122 of FIG. 4 and therefore explanations thereof are not repeated herein. The embodiment of FIG. 7 differs from the embodiment of FIG. 4 in that the first frame 422 includes a bent wall 422c as well as the sidewall 422b. The bent wall 422c is connected to the sidewall 422b and is located between the hinge bracket 426 and the sidewall 422b to enhance structural strength.

In summary, in embodiments of the present invention, the hinge bracket is screwless-mounted to the first frame. Therefore, the room for screw-mounting is not required in the display device, such that the overall structure has a reduced thickness and width, which facilitates the low-profile and lightweight designs. In addition, under the condition where the first frame with small thickness is selected in order to reduce the overall structure thickness, the hinge bracket may be first mounted to the first frame during assembly of the display device, such that the first frame with small thickness has sufficient structural strength for subsequent assembly steps. Furthermore, inserting the end of the hinge bracket into the positioning slot of the back cover can not only make the overall structure more solid, but it can also reduce the space the hinge bracket occupies in the display device to further reduce the width of the display device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device comprising: a back cover having a positioning slot; and a display module comprising: a first frame fixed to the back cover; a panel module fixed to the first frame; a hinge assembly; and at least one hinge bracket having two ends and screwless-mounted to the first frame, wherein one end of the hinge bracket is inserted into the positioning slot to fix the display module to the back cover, such that the other end of the hinge bracket is fixed to the hinge assembly; wherein the first frame has at least one positioning hole, the hinge bracket comprises at least one positioning post, and the positioning post is inserted into the positioning hole; and wherein the panel module comprises a display panel and a backlight module, and the display panel is disposed on a second frame, wherein the first frame and the second frame are fixed to each other.

2. The display device according to claim 1, wherein the hinge bracket is adhered to the first frame.

3. The display device according to claim 1, wherein the hinge bracket is soldered to the first frame.

4. The display device according to claim 1, wherein the end of the hinge bracket protrudes beyond one side of the first frame and is inserted into the positioning slot.

5. The display device according to claim 4, wherein the other end of the hinge bracket protrudes beyond another side of the first frame and is fixed to the hinge assembly.

6. The display device according to claim 5, wherein the hinge assembly is fixed to the back cover and the panel module is a panel module with touch function.

7. The display device according to claim 1, further comprising a front frame fixed to the back cover, wherein the display module is located between the front frame and the back cover.

8. The display device according to claim 1, wherein the first frame comprises a sidewall, the hinge bracket is fixed to an outside of the sidewall, and the sidewall is located between the hinge bracket and the panel module.

9. The display device according to claim 8, wherein the first frame further comprises an extension wall, and the extension wall is connected to the sidewall and surrounds at least part of the hinge bracket.

10. The display device according to claim 8, wherein the first frame further comprises a bent wall, and the bent wall is connected to the sidewall and is located between the hinge bracket and the sidewall.

11. The display device according to claim 1, wherein the first frame comprises a sidewall, and the hinge bracket is fixed to an inner side of the sidewall and is located between the sidewall and the panel module.

12. A method for assembling a display device, comprising: providing a first frame and at least one hinge bracket; fixing the hinge bracket having two ends to the first frame in a screw less manner; providing a panel module; fixing the panel module to the first frame after fixing the hinge bracket to the first frame; providing a back cover, the back cover having a positioning slot; and after fixing the panel module to the first frame, fixing the first frame to the back cover by forwardly inserting one end of the hinge bracket into the positioning slot at a stop position and fixing the other end of the hinge bracket on the back cover; wherein the first frame has at least one positioning hole, the hinge bracket comprises at least one positioning post, and the step of fixing the hinge bracket to the first frame comprises inserting the positioning post into the positioning hole; and wherein the panel module comprises a display panel and a backlight module, the display panel is disposed on a second frame, and the first frame and the second frame are fixed to each other.

13. The method for assembling the display device according to claim 12, wherein the step of fixing the hinge bracket to the first frame comprises:
  adhering the hinge bracket to the first frame.

14. The method for assembling the display device according to claim 12, wherein the step of fixing the hinge bracket to the first frame comprises:
  soldering the hinge bracket to the first frame.

15. The method for assembling the display device according to claim 12, further comprising:
  providing a hinge assembly; and
  fixing the hinge assembly to the hinge bracket.

16. The method for assembling the display device according to claim 12, further comprising:
  providing a front frame; and
  fixing the front frame to the back cover such that the display module is located between the front frame and the back cover.

* * * * *